Feb. 17, 1970 J. A. LETTENEY 3,495,678
VEHICLE SPEED CONTROL
Filed Nov. 1, 1967 2 Sheets-Sheet 1
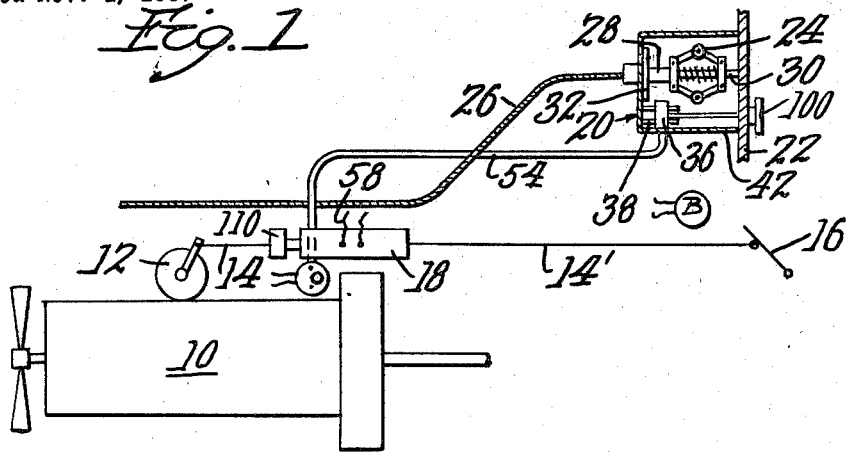
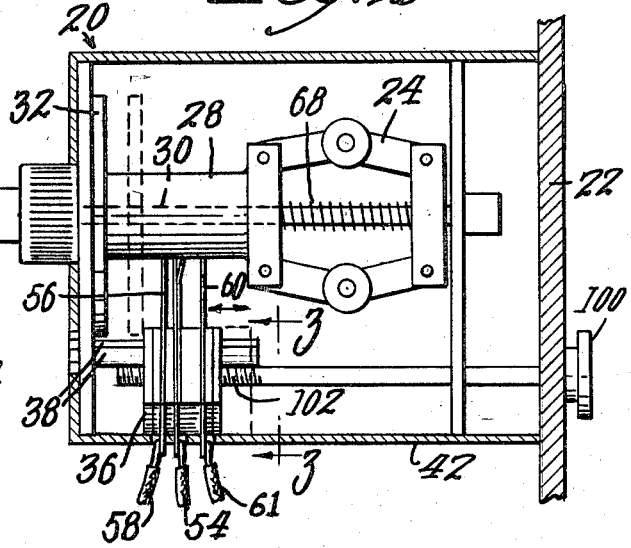
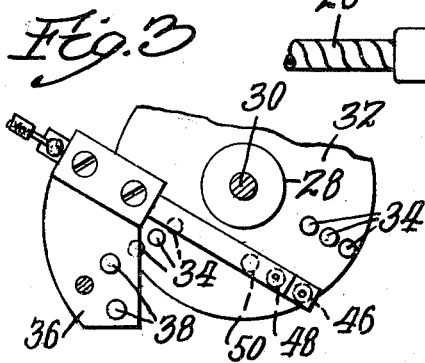
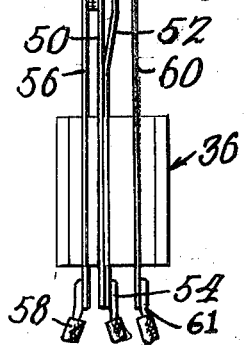
Inventor
John A. Letteney
By Charles R. Fay,
Attorney Feb. 17, 1970   J. A. LETTENEY   3,495,678
VEHICLE SPEED CONTROL
Filed Nov. 1, 1967   2 Sheets-Sheet 2
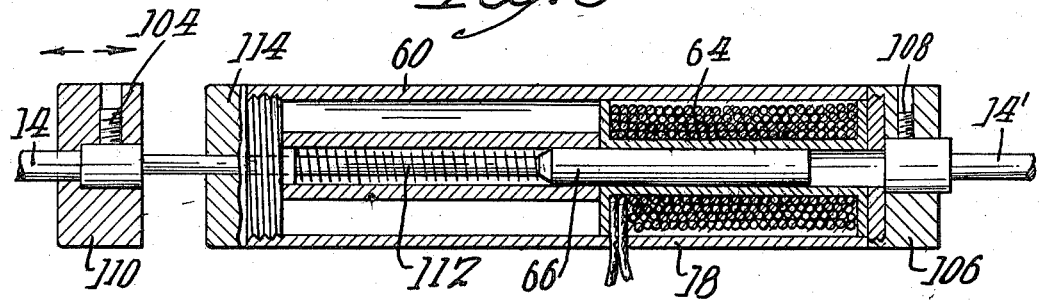
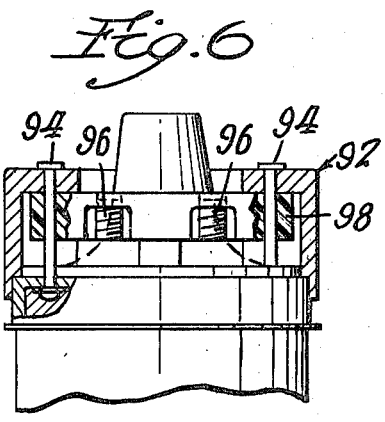
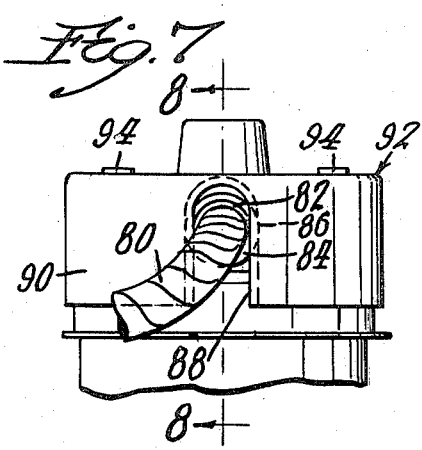
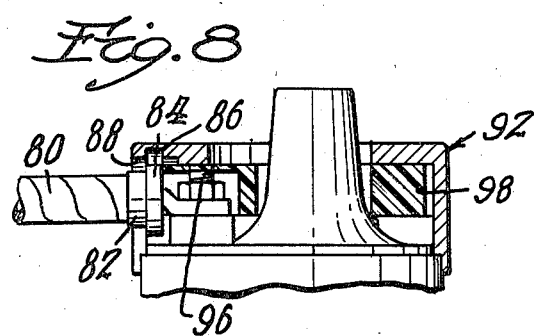

United States Patent Office 3,495,678
Patented Feb. 17, 1970

3,495,678
VEHICLE SPEED CONTROL
John A. Letteney, Main St., Lancaster, Mass. 01523
Filed Nov. 1, 1967, Ser. No. 679,878
Int. Cl. B60r 25/00; B60k 27/00; F02d 11/10
U.S. Cl. 180—106                               8 Claims

ABSTRACT OF THE DISCLOSURE

A safety control for preventing excess speed of vehicles comprising means stimulated by the speed of the vehicle automatically deenergizing the means feeding fuel to the engine but reenergizing the same immediately upon the speed dropping to the predetermined limit, so that the interruption to the feed of the fuel depends upon the speed of the vehicle whether on a level or going up and down hill, acceleration being maintained in all circumstances up to the set limit of the speed.

The invention also contemplates the provision of means for preventing jumping of the engine coil without the use of great pressure to break parts off.

The safety control is easily reversible for use with push or pull fuel feed devices, and a special electrical contact will intermittently open the ignition rapidly to provide speed control thereby in the event the speed control per se is immobilized.

---

This invention relates to a new and improved means for cutting off fuel actuation to an internal combustion engine, gas or diesel, at a predetermined rate of speed of the vehicle. A sensing device is used to determine the speed of the vehicle such as for instance a centrifugal governor or the like stimulated by the speedometer cable, i.e., depending upon the speed of rotation of the wheel of the vehicle, the governor controlling electrically a device such as a solenoid or the like, for locking and unlocking the push (or pull) rod connecting the accelerator pedal and the carburetor so that there is, at a predetermined rate of speed, a releasing action of such rod completely cancelling any fuel flow, the mechanism being such that immediately upon the vehicle slowing down, the solenoid or other mechanism for locking the rod is made once again effective for the usual control of the vehicle.

In this way, speed is controlled as to precise miles per hour whether on a level or on an incline and acceleration is retained at all times up to the predetermined limit at which the apparatus is set.

The invention also contemplates a very quick and easy setting of the device from zero miles per hour to a reasonable upper limit of speed; and the provision of anti-theft means forming a part of the combination of the device and relating to the coil, it being well known that most cars are stolen by jumping the connections of the coil, the new construction in the present case essentially preventing such action except in the presence of the necessary exertion of a high degree of force in order to break the parts of the coil which protect its connections.

Other objects and advantages of the invention will appear hereinafter.

Reference is to be had to the accompanying drawings in which:

FIG. 1 is a view illustrating generally the relationship of the parts of the device to an engine;

FIG. 2 is a view on an enlarged scale showing the control device or governor;

FIG. 3 is a section on line 3—3 of FIG. 2;

FIG. 4 is a view on a further enlarged scale illustrating the contacts in the control device;

FIG. 5 is a sectional view illustrating the fuel control device;

FIG. 6 is a section through a part of a coil showing the novel safety device therefor;

FIG. 7 is a view in elevation illustrating the same, and

FIG. 8 is a section on line 8—8 of FIG. 7.

Now referring to FIG. 1, the reference numeral 10 indicates an engine and it is to be understood that this invention is equally applicable to gasoline engines or to diesels. In the illustration of the invention however, the carburetor is indicated at 12 and the control rod 14, 14' extends from the carburetor to e.g. the foot pedal or accelerator 16. The reference numeral 18 indicates the connect-disconnect device under control of the speed control device generally indicated at 20 on the dashboard 22 or in an adjacent location.

The speed control device may comprise e.g. a centrifugal governor 24 which is attached to and stimulated through a speedometer cable 26 or to some other cable which is connected with respect to the wheels of the vehicle so as to sense the speed thereof, the governor of course acting in the usual manner under centrifugal force causing an attached member 28 to move along a central supporting shaft 30 or the like from an extreme position to the left in FIG. 2 at low or no speed to an extreme right-hand position as will be made more clear hereinafter. The element 28 is provided with a circular member 32 on which appears bumps or projections 34 for contact with electrical contacts on a support 36 shown in FIG. 3.

The contact support 36 is slidably mounted on rods 38 mounted in a box 42 which contains the governor.

As the speed of the vehicle increases, the governor causes members 28 and 32 to be drawn to the right in FIG. 2, and the latter eventually contacts switch actuators 46 and 48 which are mounted on leaves 50 and 52 energized through a wire 54 at all times. The contact 50 is normally closed with respect to electric contact 56 which leads as for intsance through a wire 58 to the device 18 to control it, so that it will be seen that as long as contacts at 50 and 56 are in contact as is normally the case, current will flow to member 18, but if the projection 48 is moved to the right in FIG. 4, as for instance by member 32, this contact will be broken.

In the same manner, the contact at 60 is normally open relative to contact 52 attached to the projection or actuator 46, so that when the member 32 strikes member 46, it will move it to the right to the contact 60 and a signal connecting to contact 61 will be actuated before the disconection of the contacts 52 and 56, because projection 46 has sufficient length to bring this about. The degree of interval between the warning signal and the actuation of the speed control device is adjustable by adjusting the relative positions of the contacts.

The device 18 contains essentially a solenoid arrangement which is shown in FIG. 5, there being a winding at 64 and a core 66. When current flows through the winding the core 66 will be frozen with respect to the winding 64 and therefore the rod 14, 14' will be essentially rigid or locked so that fuel is varied as usual. When the current to this winding is interrupted, the core is free of the coil and springs or other like means can be used to physically disassociate the core from the winding 64. In this event the member 14' will have no effect on the member 14, so that when the accelerator pedal 16 is pushed further past the limit as defined by the centrifugal governor, the fuel flow is cut to idle speed.

On the other hand, as soon as the speed of the speedometer cable drops to the predetermined degree, the member 28 retreats to the left in FIG. 2 under the influence of a spring 68 and contact 52 retracts from contact 60 and contact 50 reengages contact 56 so that current again flows through the winding 64 locking the core 66 thereto and reestablishing control of the fuel with respect to the carburetor under influence of the foot pedal 16.

Referring now to FIGS. 6, 7 and 8 there is shown a simple device for preventing car theft by preventing jumping of the coil, which is the usual manner by which cars are stolen, and to this end the armored cable 80 is provided which has an end fixture 82 having a relatively enlarged annular portion 84 and a relatively enlarged annular portion 84, the latter fitting in an undercut 86 in a recess 88 in the front wall 90 of a metal cap 92. Cable 80 cannot be removed from the cap once it is applied to the coil by headed non-removable rivets or the like 94. The coil contacts are seen at 96, and the contacts are contained in a block of electric insulation material 98 but the wires of the cable 80 can be connected thereto and at the same time the cable cannot be pulled from the cap.

The point here is that without protection the coil can be easily jumped in order to allow the car to be started but with the armored cable 80 with its novel connection 84 in the recess 86, it cannot easily be pulled from the metal cap and the metal cap cannot be removed by reason of the permanent rivets 94 except by the exertion of considerable strength which is sufficient to discourage any would-be thief.

This effect is enhanced if the contacts are set at 0°, so that only fuel enough for idling is obtainable. By applying an adjustment for the contact support member 36 and sliding it on rods 38, member 32 is made effective at different speeds. A knob 100 can be used to push or pull the contact support 36 to vary the positions of the electric contacts 50, 52, etc. in a longitudinal direction to achieve the desired result by any convenient means such as screw 102.

The adjustment knob 100 is easily locked by a key, e.g. using a sliding bolt, and this can be accomplished through the ignition key if desired. Should the solenoid be inactivated in any way, as by strapping rods 14 and 14' solidly together, nevertheless the speed of the vehicle will be inhibited because of the fact that the governor will still operate and the bumps 34 will intermittently strike the contact actuator 48 to make-and-break the contacts at 50 and 56 and this deenergizes the engine and re-energizes it as though the ignition key were rapidly turned on and off, even though the rods 14 and 14' remain in fixed relation. The ignition coil and solenoid winding 64 can both be connected to wire 58 to provide the result.

In order to provide the speed control for engines that have a push action on the fuel supply rod as well as for those that have a pull action, attention is again directed to FIG. 5. Rod 14 is detachably connected to the core 66 of solenoid 18 by any kind of fastener as set-screw 104. The coil 64 is open from end to end and closed by a removable cap 106 screwed onto the casing for the solenoid and removably connected to rod 14' by a screw 108. Screw 104 is in a block 110 that can move with rod 14 and the core and a connection 112 which is spring-pressed joining the core 66 and rod 14, moving rectilinearly through a removable cap 114.

In order to reverse the action it is only necessary to remove cap 106, block 110, screw 104, and cap 114 and place the parts at the opposite end of the casing of the solenoid and connect rod 112 to rod 14'. Rod 112 could be made removable from core 66 and re-applicable to the other end of the core but it is easy to reverse the core in any case. All this can be done without the use of any special tools, and the cap 106 replaces cap 114, and block 110 and rod 112 extend out the opposite end of the solenoid casing.

Having thus described my invention and the advantages thereof, I not not wish to be limited to the details herein disclosed, otherwise than as set forth in the claims, but what I claim is:

1. An automatically acting control device for the speed of vehicles having internal combustion engines including means to control the amount of fluid fuel fed to the engine by means of a manually actuated two part element which includes an electric coil and a core therefor, said coil being normally activated, and make-and-break means in association with said element for deactivating the parts thereof so that actuation of one part fails to affect the actuation of the other part of said element, rendering the said element inoperative, a governor, means operating said governor under influence of the speed of the vehicle, said governor including means for controlling the actuation of said make-and-break means, said core being reversible in respect to the coil to be actuated by the manually actuated element selectively by a pulling action on the latter or by a pushing action thereon.

2. The device of claim 1 wherein said coil is open from end to end thereof for reception of the core from either end.

3. The device of claim 1 wherein said governor is of a centrifugal type including a rotary rectilinearly movable member actuated by means connected with respect to the wheels of the vehicle and an electric contact for supplying or shutting off electric energy to said solenoid depending upon the actuation of the movable member under influence of the speed of the vehicle through the governor.

4. The device of claim 1 including means providing an electric signal actuated by the governor immediately prior to the actuation of the make-and-break means.

5. The device of claim 1 including electric contacts and an energy supply, said contacts being normally in a position to cause the manually operated element to be in an operative condition, the governor being adapted to reverse the relationship of the contacts to cause the make-and-break means to operate to place said manually operated element in inoperative position, at a predetermined speed of the vehicle, and means to re-position the contacts in normal condition at speeds of the vehicle less than said predetermined speed.

6. The device of claim 1 including a conventional coil for the internal combustion engine, an armored electric lead thereto, electrically energized means to control the make-and-break means, said lead extending from the electrically energized means to said coil, a protective cap covering the contacts on the conventional coil preventing access thereto, permanent connections between the cap and the coil, and a substantially permanent connection of the armor of the lead to said cap.

7. The device of claim 1 wherein said make-and-break means is an electrically actuated solenoid, said governor being of a centrifugal type including a rotary rectilinearly movable member actuated by means connected with respect to the wheels of the vehicle and an electric contact for supplying or shutting off electric energy to said solenoid depending upon the actuation of the movable member under influence of the speed of the vehicle through the governor, and means under control of the governor to intermittently interrupt the ignition in conditions of failure of the solenoid operated make-and-break means.

8. The device of claim 1 wherein said make-and-break means is an electrically actuated solenoid, said governor being of a centrifugal type including a rotary rectilinearly movable member actuated by means connected with respect to the wheels of the vehicle and an electric contact for supplying or shutting off electric energy to said solenoid depending upon the actuation of the movable member under influence of the speed of the vehicle through the governor, and means under control of the governor to intermittently interrupt the ignition in conditions of failure of the solenoid operated make-and-break means, said means to interrupt the ignition comprising a bump on the rectilinearly movable member in alignment with the said electric contact.

(References on following page)

References Cited

UNITED STATES PATENTS

| | | | |
|---|---|---|---|
| 1,634,069 | 6/1927 | Cordray | 180—106 |
| 1,824,292 | 9/1931 | Murrow | 180—110 |
| 2,193,224 | 3/1940 | Cowles | 180—105 |
| 2,236,145 | 3/1941 | Kolb | 180—110 X |
| 2,265,524 | 12/1941 | Fruth | 180—110 X |
| 2,272,822 | 2/1942 | Rausch | 180—105 X |
| 2,863,962 | 12/1958 | Letteney | 200—80 X |
| 3,077,239 | 2/1963 | Simas | 180—109 |
| 3,164,220 | 1/1965 | Wurgler | 180—110 |
| 3,343,625 | 9/1967 | Scheuermann | 180—114 |

KENNETH H. BETTS, Primary Examiner

U.S. Cl. X.R.

123—102; 180—110, 114